Dec. 12, 1950 J. A. ZINN, JR., ET AL 2,533,705
HYDRAULIC CONTROL APPARATUS
Filed March 13, 1948 4 Sheets-Sheet 3
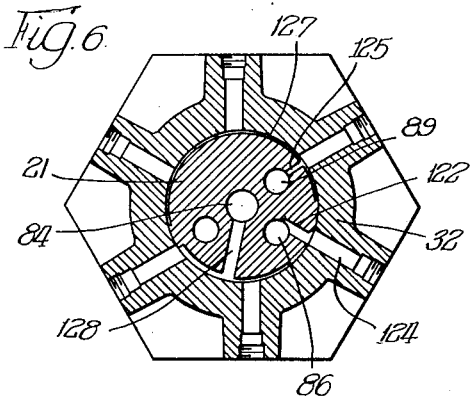
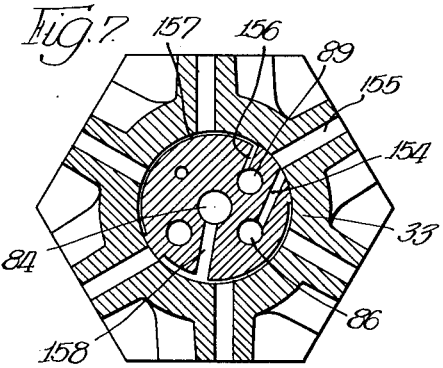
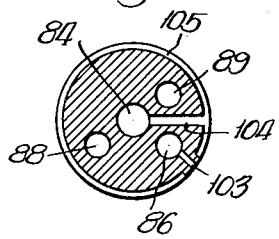
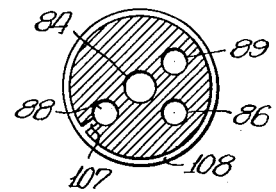
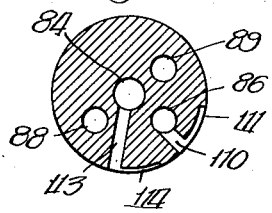
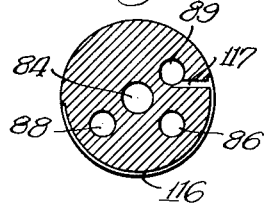
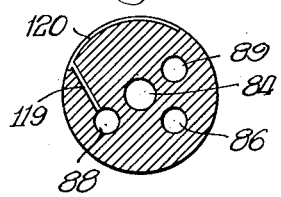
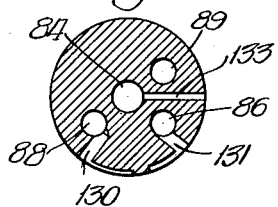
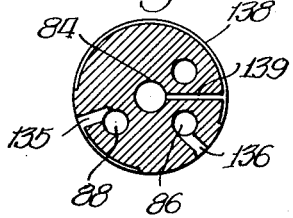
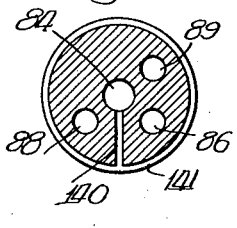
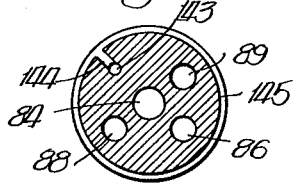
INVENTORS
Julius A. Zinn, Jr.,
BY Odd Wennberg,
Wilkinson, Huxley, Byron & Hume
Attys Dec. 12, 1950   J. A. ZINN, JR., ET AL   2,533,705
HYDRAULIC CONTROL APPARATUS
Filed March 13, 1948   4 Sheets-Sheet 4
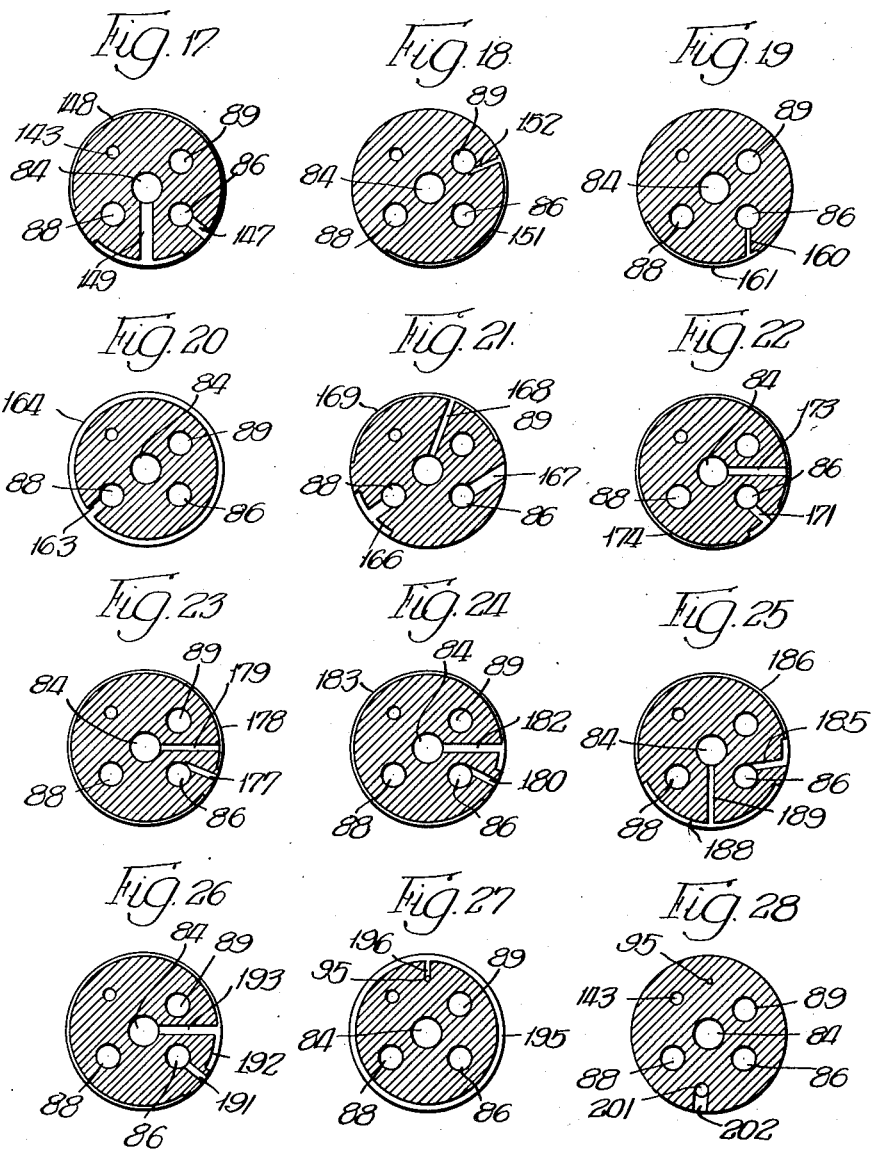
INVENTORS.
Julius A. Zinn, Jr.,
BY Odd Wennberg,
Wilkinson, Huxley, Byron & Hume
ATTYS.

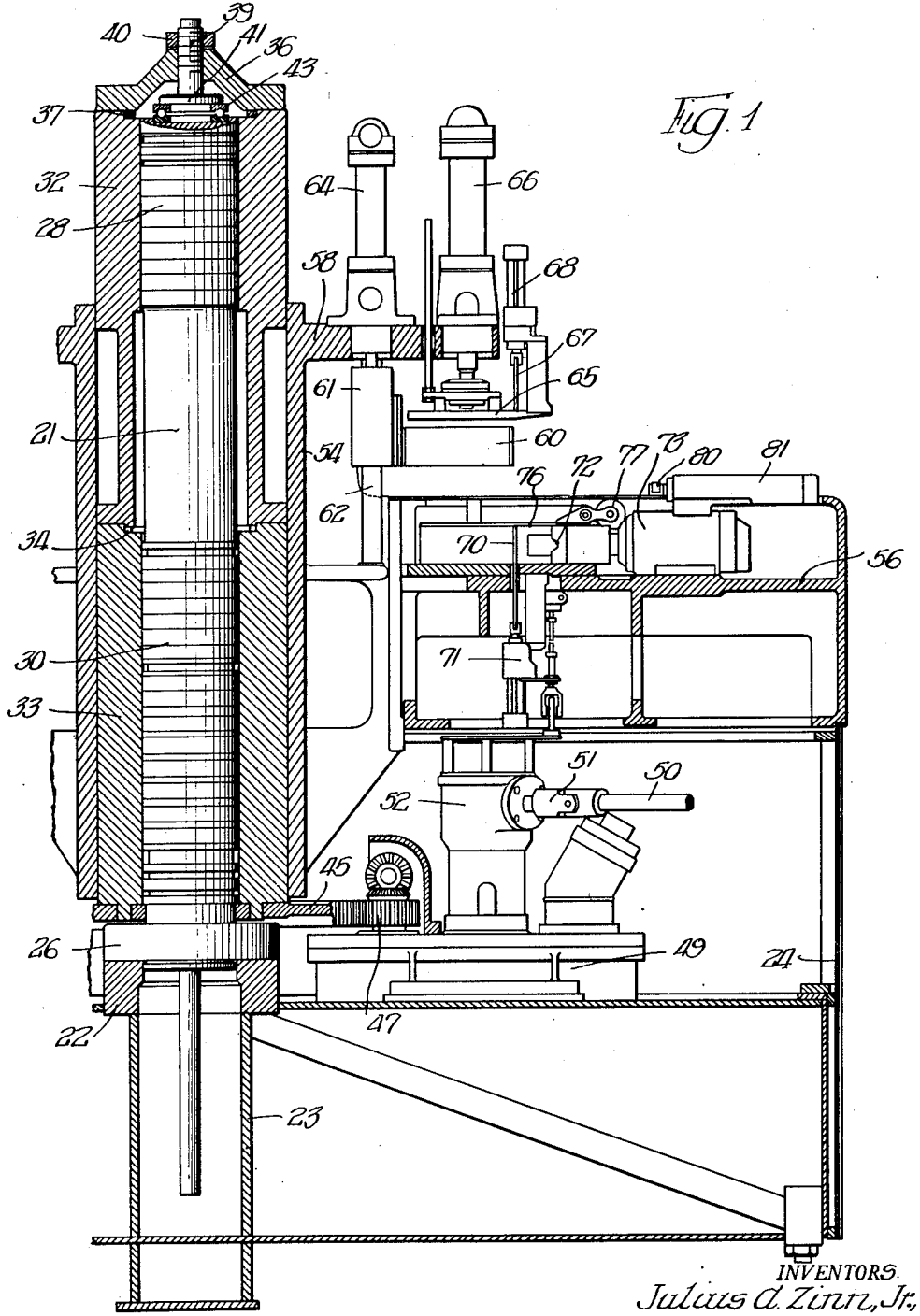

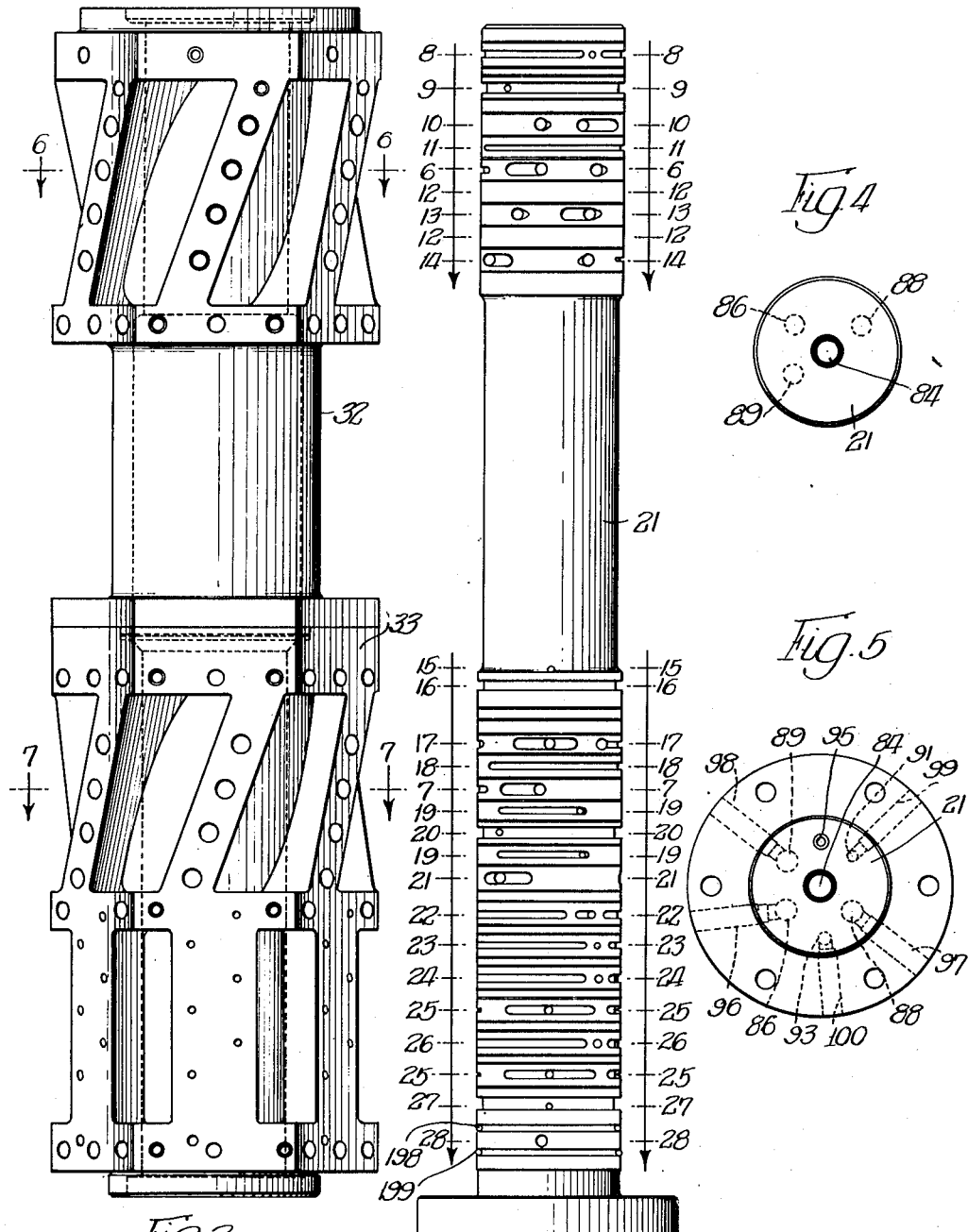

Patented Dec. 12, 1950

2,533,705

UNITED STATES PATENT OFFICE 2,533,705

HYDRAULIC CONTROL APPARATUS

Julius A. Zinn, Jr., Chicago, Ill., and Odd Wennberg, Manhasset, N. Y.; said Wennberg assignor to said Zinn Application March 13, 1948, Serial No. 14,794

3 Claims. (Cl. 60—97)

This invention relates to a new and improved power control apparatus and more particularly to control apparatus for supplying fluid power to forms of apparatus performing cyclic operations and hence requiring accurately controlled flow of power in predetermined timed relationship.

The invention has been shown as applied to a type of carton forming machinery generally similar to that disclosed in the prior application Serial No. 752,364, filed June 4, 1947, by Julius A. Zinn, Jr. It will be understood, however, that our improved power control apparatus is suitable for many other types of apparatus which involve cyclic operation. By way of example and not by way of limitation, other such uses would include forming apparatus for forming soap, for forming articles from plastic or moldable material, for wrapping articles in coverings of sheet material, or for filling and closing bottles or containers.

Our improved construction provides a smooth and continuous flow of power to any apparatus having a plurality of power actuated means, which means are operated in a predetermined sequence with accurately predetermined timing. Such types of machines have heretofore been generally operated by cam means with or without the addition of variable stop and go and timing means such as star wheels or Geneva motions. All such forms of apparatus are open to numerous objections, including the fact that they are noisy and mechanically inefficient. They are also open to the very serious objection that any wear of any cam, wheel, or linkage will vary the operation of the apparatus. Hence they require continuous check and adjustment to maintain them in efficient operation.

With many types of forming apparatus having a plurality of moving elements, such for example as that disclosed in the prior application above mentioned, extreme accuracy of movement and positioning of the parts and of timing their relative movements is essential. The apparatus of the present invention not only provides such accuracy, but maintains it throughout extended use without the necessity for adjustment or compensation for wear of the power control parts.

It is an object of the present invention to provide a new and improved power control apparatus.

It is a further object to provide apparatus of this character in which the flow of fluid under pressure is controlled by relative rotation between adjacent and contacting surfaces having ports therein.

It is an additional object to provide a construction in which the pressures applied to the surfaces are balanced to insure smooth operation and minimize wear.

It is also an object to provide apparatus in which fluids under different pressures may be applied in sequence to certain operating mechanisms.

It is another object to provide a cyclic control adapted to control operating fluid flow from certain sources to a plurality of operating mechanisms associated with said sources to thereby control the relatively timed operation of said plurality of operating mechanisms from a single control apparatus.

It is a further object to provide apparatus of this character adapted for commercial production and use.

Other and further objects will appear as the description proceeds.

We have shown a preferred embodiment of our invention in the accompanying drawings, in which—

Figure 1 is a fragmentary vertical section showing the application of our control to one form of apparatus;

Figure 2 is an elevation of the sleeve or housing fitting about the pintle of the apparatus;

Figure 3 is an elevation of the pintle;

Figure 4 is a top view of the pintle;

Figure 5 is a bottom view of the pintle;

Figure 6 is a section taken on line 6—6 of Figure 2, showing both the sleeve and pintle;

Figure 7 is a section similar to Figure 6, taken on line 7—7 of Figure 2; and

Figures 8 to 28 inclusive are sections taken on lines 8—8 to line 28—28 inclusive of Figure 3.

Referring first to the form of construction shown in Figure 1, this figure illustrates somewhat diagrammatically one form of apparatus adapted to be controlled by our apparatus for the control of fluid power. The form of apparatus shown is generally similar to that disclosed in the co-pending application of Julius A. Zinn, Jr., above identified. The pintle or central member 21 is supported on the base 22 which is carried by the framework 23. This framework 23 is circular in plan and is provided with an outer housing 24. The pintle 21 has the flange 26 secured thereto and resting on the support member 22. As shown in the drawing, the upper portion 28 of the pintle and the lower portion 30 are each provided with a multiplicity of grooves and ports. These will be described in more detail hereafter in connection with the detailed figures of the drawing.

The pintle 21 is enclosed in a closely fitting housing comprising the upper member 32 and the lower member 33. These members are secured together and their joint is provided with a packing ring 34 to prevent leakage of fluid under pressure. The upper housing member 32 has valve housing cover 36 secured thereto, the joint being closed by packing ring 37. This cover member 36 has a threaded opening receiving the adjusting screw 39, which is held in adjusted position by the lock nut 40. The lower end of screw 39 is provided with the thrust plate 41 which rests on the thrust bearing 43. This thrust bearing 43 is seated on top of the center or pintle member 21 and serves to support the entire housing assembly, together with the operating parts carried thereby.

The lower housing member 33 is provided with the large gear 45 which serves to rotate the housing assembly upon the pintle. This gear 45 is driven by pinion 47 which, in turn, is driven by the drive mechanism 49 which as shown is in the form of a fluid motor operated by fluid under pressure. The drive shaft 50 driven through universal joint 51 from housing 52 serves to drive auxiliary apparatus, such as a feeder, in synchronism with the operation of the housing assembly. The operating apparatus support frame 54 is secured to a face of the housing assembly, this assembly preferably having a plurality of flat sides. As shown in Figures 6 and 7, the specific construction shown in the drawing has six such flat sides or faces. This bracket or frame 54 supports the frame 56 which carries certain of the operating mechanism. This frame 56 thus rotates with the housing assembly. Member 54 has an upper bracket 58 which carries additional portions of the operating mechanism.

The form of construction of the operating mechanism forms no part of the present invention, which relates to the control of the fluid power for operating the apparatus. It will be described briefly for the sake of clarity and understanding of the operation of the invention. The apparatus shown is adapted for forming a carton from a flat blank. It comprises a mandrel 60 supported on a bracket 61 sliding on rods 62 and moved up and down by a piston rod controlled by power cylinder 64. An upper pressure plate 65 is operated by cylinder 66 and a top tucker 67 is operated by cylinder 68. Other operating parts are carried by the frame 56, these including the bottom tucker 70 operated by cylinder 71 and the bottom pressure plate 72 operated by cylinder 73. Top folders 76 are operated by cylinder 77, and an indexing or loading member is operated by cylinder 81. Other operating mechanism, not shown, is provided for operating side tuckers and side pressure plates.

It will be apparent that the apparatus shown is one which requires carefully and accurately co-ordinated operation of a plurality of fluid operated members. The members must be operated in proper sequence and timed relationship, and there is a complete cycle of operation which is continuously repeated. In this form of apparatus, it will be understood that there will be six similar operating assemblies, one secured to each of the six faces of the housing assembly. It is also to be understood that the present invention is independent of the details of construction of the operating mechanism, since it is capable of controlling the operation of apparatus for many other purpose than for making cartons.

An added feature of the carton making machines shown is the fact that it is desirable to operate certain portions of the mechanism under one fluid pressure and thereafter apply a higher fluid pressure. One such portion of the mechanism is the top pressure plate 65. Certain portions of the carbon blank, which are previously coated with adhesives, are folded by the side folding member 76 over the top of the mandrel and thereafter immediately pressed against the mandrel by the pressure plate 65. It is desirable to have the initial contact of that plate under comparatively low pressure and thereafter to apply heavy pressure to assist in proper bonding of the adhesive. The same thing is true of the bottom pressure plate 72. It is obvious that this sequential use of different pressures has application in other forms of apparatus for molding and forming various articles. As will be pointed out in detail hereafter, our particular form of control of fluid pressure is adapted for providing this sequential flow of fluid under different pressures.

The mandrel, the various pressure plates and folders, the tuckers and movable registering member shown are all operated by fluid pressure actuated pistons carried in the cylinders also shown in the drawing. The fluid under pressure is fed to these several cylinders and also exhausted therefrom through a plurality of pipes or conduits leading from the housing 32. These pipes have been omitted in order to simplify the drawing. Many of the passages in the housing to which these pipes connect are shown in Figures 2, 6 and 7 of the drawings. Any usual form of supply of fluid under pressure is also provided to feed fluid under pressure to certain of the longitudinal passages in the pintle, the central passage serving to return the spent fluid to a sump for reuse.

Referring to the drawings which show in detail a specific form of pintle and housing, the top and bottom views of the pintle, Figures 4 and 5 and the various sections, Figures 6 to 28 all show a plurality of vertically extending longitudinal passages in the pintle member 21. The central passage 84 is a return passage which serves to return fluid from the operating cylinders to a sump or fluid reservoir from which it is drawn for reuse.

The similar passages 86 and 88 are used to conduct fluid under the regular operating pressure to the cylinders. Two passages are used in order that adequate pressure uniformity will be maintained when the various cylinders draw fluid in their operation. It will be understood that these various operations are intended to be very rapid and the flow of fluid must be instantaneous under properly uniform pressure as the several ports are opened in predetermined sequence.

The passage 89 is provided for the supply of fluid under high pressure to certain of the ports. One passage for such pressure is adequate in the present apparatus for the reason that such pressure is only used in two cylinders and, for the further reason, that there is very little actual flow of fluid from this passage. The pistons in the cylinders served by the high pressure passage will already have been moved by fluid under regular pressure, and the only function of the high pressure fluid is to apply an additional holding force. This additional holding force may cause a slight further movement of the piston in compressing the folded carton parts, but actual fluid flow will be small.

In addition, there are other vertical passages in the pintle 21 which do not, however, extend the full length of the pintle. These are shown in the bottom view Figure 5 and certain of the lower sections. The passage 91 serves as a suction or vacuum passage and serves to draw off, through suitable tubing and connections, fluid which may leak through the packing or glands of certain of the cylinders. Passage 93 leads in air under pressure which is conducted through the mandrel 60 to blow completed cartons from the mandrel. The small passage 95 is an additional drain connected, as shown in Figure 27, to drain off seepage or leakage fluid above the air port.

As is shown in Figure 4, the passages 86, 88 and 89 are plugged at the top end of the pintle. Passage 84 is left open to drain any upward seepage of fluid under pressure from the lateral ports. This fluid serves to lubricate the bearing 43. As shown in Figure 5, the lower ends of passages 86, 88, 89, 91 and 93 are plugged and horizontally extending passages in the base 26, these passages being designated 96, 97, 98, 99 and 100 respectively, lead to the outer face of the member 26 where they are connected to suitable piping.

The various cross sections of the pintle, which include the transverse ports and passages, are shown in Figures 6 to 28 inclusive. These various sections are taken at the indicated planes through Figure 3. It is to be noted that Figures 6 and 7 include a cross section of the surrounding housing members 32 and 33. Other sections through these housing members would be generally similar and have not been included in Figures 8 to 28.

The top most port section taken on line 8—8 of Figure 3 is shown in Figure 8. This shows the ports which operate the top tucker in the downward direction. These ports are, therefore, connected through passages in the housing member 32 to the upper portion of cylinder 68 shown in Figure 1. As shown, the port 103 leads from low pressure passage 86 to the outer surface of the pintle. The transverse passage 104 connects a drain groove 105 to the drain passage 84 so that pressure may drain from the piston side of the cylinder 68 throughout the major portion of the rotation of the housing and operating assembly.

Figure 9 shows the port leading to the rod end or lower end of top tucker cylinder 68. It will be noted that passage 107 leads from low pressure passage 88 to a continuous circumferential groove 108. Thus, the piston rod side of the cylinder 68 is continuously supplied with low pressure fluid. The piston is moved downwardly momentarily by the application of the same low pressure through port 103 of Figure 8, after which it is returned to its upper position. Although the pressures per unit area are the same on both the rod and piston sides of the cylinder, there is an actual differential operating pressure due to the reduced area on the rod side caused by the cross section of the rod itself.

Figure 10 shows the ports causing the downward movement of the mandrel 60. The passages corresponding to these ports in the upper housing member 32 are, therefore, connected by suitable piping to the upper end of cylinder 64 shown in Figure 1. The downward movement is caused by flow of low pressure fluid from longitudinal passage 86 through lateral passage 110 which has an elongated opening 111. It will be noted that the mandrel is held down through a major portion of the cycle of operation, since it is not returned to its upper position until the same passage in housing 32 comes opposite the horizontal passage 113 in Figure 10, this passage leading to the drain 84 and having an elongated face opening 114.

Figure 11 shows a high pressure balancing groove 116 which is connected by passage 117 to the longitudinal high pressure passage 89. There are no ports in the upper housing member 32 corresponding to this passage 117. Its sole function is to provide a balancing or counter-balancing pressure against the inner face of the housing member.

As shown in Figure 3, the next transverse section is taken on line 6—6 and is shown in Figure 6 in combination with the corresponding section of the housing member 33. The section shown in Figure 6 is taken through the ports leading to the top pressure head 65 which is operated by cylinder 66. This is one of the multiple pressure sections. The passage 122 leads from the vertical low pressure passage 86 to the face of the mandrel and, as the housing member 32 rotates, it communicates one after the other with the several identical passages 124 formed in the housing member. These passages 124 are connected by suitable piping to the upper or piston end of cylinder 66. The horizontal passage 125 leads from the vertical high pressure passage 89 to the pressure groove 127. This groove 127 extends throughout a substantial portion of the outer arcuate surface of the pintle 21 and the piston in each cylinder 66, connected to a passage 124, is subjected to the high pressure from passage 89 throughout this substantial portion of the arc of rotation of the housing. The fluid from the piston end of cylinder 66 is drained through passage 128 to the vertical drain passage 84.

Figure 12, as will be noted from Figure 3, is representative of two different cross sections of the pintle 21. These are both low pressure balancing sections. The horizontal passage 119 leads from the longitudinal low pressure passage 88 to the balancing pressure groove 120. As in all balancing sections, there are no corresponding ports in the housing.

Figure 13 shows a section taken through the ports leading to the rod or lower end of the mandrel cylinder 64. The horizontal passage 130 leads from low pressure passage 88 to the face of the pintle and a similar passage 131 leads from low pressure passage 86 to the pintle face. The drain from the rod end of the mandrel cylinder is through passage 133 to the central drain passage 84.

The section shown in Figure 14 is taken through the ports and passages leading to the rod or lower end of the top pressure plate cylinder 66. The passage 135 leads from low pressure passage 88 to the surface of the pintle, and a similar passage 136 leads from the passage 86. Drain of this fluid under pressure is through the elongated groove 138 and passage 139 to the vertical drain passage 84.

Figure 15 is taken on a section which is merely provided with a drain passage 140 leading from a circumferential groove 141 to the vertical drain passage 144. This is for the purpose of returning to the sump any liquid under pressure which may work its way into the space about the intermediate portion of the pintle 21.

Figure 16 shows a section through the upper portion of a vertical passage 143 which constitutes a vacuum drain connected by horizontal passage 144 to the circumferential groove 145. Thus, all ports aligned with the groove 145 are constantly under sub-atmospheric pressure or suction. These ports are connected by suitable piping to such parts of the apparatus as desired to draw off any of the operating fluid which may leak or work through the glands of the corresponding cylinders. Normally such a vacuum drain will only be provided in connection with cylinders such as cylinders 64, 66 and 68 where the leaking liquid is located above the work and, consequently, might drop upon and spoil blanks being formed by the machine.

Figure 17 shows the ports and passages leading to side pressure plates which serve to force portions of the carton blank against the sides of the mandrel 60. These have not been shown in the drawing, but are similar to those cylinders which have been shown and, in detail, form no part of the present invention. These side pressure plate cylinders receive fluid under the lower pressure through passage 147 from the vertical passage 86. Since these plates are held pressed against the side of the mandrel throughout a substantial portion of the rotation of the housing and operating assemblies, the passage 147 is connected to the elongated feed groove 148. Fluid is drained off from these cylinders through passage 149 leading to the vertical drain passage 84.

Figure 18 is a section through another high pressure balancing port and passage construction. The pressure transmitting groove 151 is connected by passage 152 through high pressure passage 89.

The next downward section in the pintle is shown in Figure 7. This illustrates the ports controlling the bottom pressure cylinder 73 shown in Figure 1. The low pressure fluid from the longitudinal low pressure passage 186 passes through horizontal passage 154 which conducts fluid, in turn, to the several passages 155 in the lower housing member 33. This low pressure fluid causes the inward movement or movement to the left, as seen in Figure 1, of the piston. High pressure is then applied to the piston to finally form and hold the carton bottom by means of fluid leading from high pressure passage 89 through horizontal passage 156 to the arcuate pressure groove 157. Final drain from the piston side of the cylinder is through port 158 to the central drain passage 84.

The next lower section, shown in Figure 19, is another low pressure balance section. Low pressure fluid from passage 86 is carried through horizontal passage 160 to the balancing groove 161.

Figure 20, the next lower section, shows a port 163 leading from low pressure passage 88 to the circumferential groove 164 for providing continuous low pressure fluid to a manifold connected to the rod side of a plurality of the cylinders. As was discussed in connection with Figure 9 and the operation of the top tucker cylinder 68, a number of the cylinders have differentially operated pistons. The low pressure fluid is kept at all times in the rod end of the cylinders. This eliminates the necessity for duplicating ports and passages. It is only necessary to control the flow of fluid under the same pressure to the piston end of the cylinder and of the drain of fluid from that end of the cylinder to completely control the timed reciprocation of the piston in the cylinder.

It will be noted that specific controls for the flow of low pressure fluid to the piston ends of certain cylinders has been shown. These are as follows; side pressure plates Figure 17, indexing member cylinder 81, Figure 22, bottom tucker cylinder 71, Figure 23, right and left folder cylinder 77, Figures 24 and 26, and the bottom side tuckers, Figure 25.

The ports and passages of Figure 20 afford a continuous supply of fluid to a manifold which has connections to the rod ends of these cylinders. These connections are to the side pressure plate cylinders, indexing member cylinder, bottom tucker cylinder, right and left folder cylinders and the two bottom side tucker cylinders. While this single passage 163 of Figure 20 supplies fluid to a plurality of cylinders, it is adequate in area because of the manifold arrangement. Because of the continuous cyclic operation, the manifold is continuously receiving fluid from certain cylinders as it is supplying it to others.

Figure 21 illustrates the ports leading to the rod end of the bottom pressure cylinder 73. Low pressure fluid is led from passage 88 through port 166, and similar fluid from passage 86 is led through port 167. Drain of this fluid is through passage 168 leading from the arcuate groove 169.

The ports shown in Figure 22 lead to the piston end of the indexing or loading cylinder 81. The port 171 leads from low pressure passage 86 to the outer face of the pintle, and drain of this fluid is through passage 173 to central passage 84. The drain passage 173 is connected to the long arcuate groove 174, since the indexing cylinder merely operates very quickly to feed and index the blank and spends the major portion of its time in the right-hand or non-operative position.

Figure 23 shows the ports leading to the piston side of the bottom tucker cylinder 71 of Figure 1. These tuckers operate instantaneously and then return to normal position. The low pressure fluid for operation of the tuckers comes from passage 86 through horizontal passage 177. Drain is from the long arcuate groove 178 through passage 179 to drain passage 84.

Section 24 shows the ports for operating the right folder. This folder is shown at 76 and is operated by cylinder 77. The operating fluid passes through passage 180 from vertical passage 86. Drain is through passage 182 to vertical drain passage 84. Here again a very long arcuate groove 183 is provided in connection with the drain passage, since these folders move very rapidly and then return and remain in their inoperative position through the major portion of the cycle of operation.

The ports shown in Figure 25 serve to operate the tuckers which move inwardly from each side of the bottom to give a final fold to the bottom forming members of the carton. These tuckers remain in position and are held down by the bottom pressure plate 72 operated by cylinder 73. Therefore, the pressure for operating them, which comes from passage 185 from vertical passage 86, is maintained throughout an extended portion of the rotation of the apparatus by means of the arcuate groove 186. Drain of this fluid is through arcuate groove 188 and passage 189 to the central drain 84.

Figure 26 shows the ports for operating the cylinder actuating the left-hand folder, which is not shown in Figure 1 of the drawing, but which is substantially identical with the right-hand folder 76 and is operated by a cylinder similar to cylinder 77. This operation is also very rapid and is accomplished by fluid under pressure through passage 191 from vertical passage 86. This end of the cylinder is open to drain through most of the period of rotation through the arcuate groove 192 which leads to passage 193 and the central drain passage 84.

The section shown in Figure 27 is taken through another drain which serves to draw off any fluid under pressure which has leaked downwardly to this point. The circumferential groove 195 is connected by passage 196 to the vertical drain passage 95. It is desirable, in this particular machine, to provide a drain at this point so as to prevent any possible leakage of liquid down into the next section, which is shown in Figure 28 and contains the port for the air for blowing off the finished carton from the mandrel. It will be realized that the carton on the mandrel would be spoiled if any oil were blown onto it from the air. As a further protection at this point, as shown in Figure 3, packing rings 198 and 199 are provided in grooves located above and below the section shown in Figure 28.

Figure 28 includes the upper portion of the vertical passage 201 which supplies air under pressure, this air under pressure being conducted by horizontal passage 202 to the face of the pintle. It will be understood that ports formed in the lower housing member 33 are located in this plane and serve to conduct air under pressure through suitable piping to each mandrel 60 in turn and, at the proper time in the cycle of operation, to blow off the completed carton.

It has been stated that a number of the cylinders are normally continuously supplied with fluid under pressure to their rod ends. This serves to normally maintain the operating members associated with such cylinders in their retracted or inoperative position. In addition to the elimination of ports and tubing, which is accomplished by this continuous application of fluid under pressure, it also has additional advantages. It insures the immediate retraction of such operating members in the event of an emergency stop of the apparatus. It also further insures all operating members controlled in this manner being in their retracted position when the machine is started, which eliminates any possibility of jamming of operating members prior to all motions being synchronized.

While one particular form of apparatus and the specific control construction for that apparatus have been shown and described in some detail, these are to be understood to be illustrative only. The control apparatus is dependent upon relative rotation between a pintle or central member and housing to control fluid flow and, thus, control the operation of a machine. The particular pintle and housing and machine shown are quite complex and include liquid flow under different pressures, a return flow of liquid, drains, the application of suction and the application of air under pressure. They, therefore, illustrate the versatility of our control apparatus and its wide applicability to the control of machine operations, particularly those cyclic in character and involving a plurality of substantially identical operating assemblies.

It will be apparent, however, that the control apparatus is capable of modification to meet varying conditions and requirements and we contemplate such modifications as come within the spirit and scope of the appended claims.

We claim:

1. Apparatus for the control of fluid power comprising a central member circular in cross section, a housing assembly closely fitted on the central member, means for causing relative rotation between the central member and housing assembly, a plurality of fluid passages in the central member, ports in the outer surface of the central member communicating with the passages, certain of the central member passages carrying fluid under different pressures, other of said passages serving to drain fluid, certain ports in the central member located in the same transverse plane leading to the passages carrying fluid under the different pressures and a drain passage, the housing having a plurality of axially spaced ports, certain of said ports being located in such transverse planes as to consecutively register with ports carrying fluid under different pressures and a drain port during relative rotation of the central and housing members, the housing having passages leading from said ports to fluid power operated apparatus.

2. Apparatus for the control of fluid power comprising a central member circular in cross section, a housing assembly closely fitted on the central member, means for causing relative rotation between the central member and housing assembly, a plurality of fluid passages in the central member, ports in the outer surface of the central member communicating with the passages, certain of the central member passages carrying fluid under different pressures, other of said passages serving to drain fluid, certain ports in the central member located in the same transverse plane leading to the passages carrying fluid under the different pressures and a drain passage, the housing having a plurality of axially spaced ports, certain of said ports being located in such transverse planes as to consecutively register with ports carrying fluid under different pressures and a drain port during relative rotation of the central and housing members, the housing having passages leading from said ports to fluid power operated apparatus, the housing having an imperforate surface in registration with other of the pintle ports throughout the rotation of the housing, the several pintle ports being so related in area and location as to provide pressure against the housing substantially balanced about the vertical axis of the pintle.

3. Apparatus for the control of hydraulic power comprising a central member circular in cross section, a housing assembly closely fitted on the central member, means for causing relative rotation between the central member and housing assembly, a plurality of fluid passages in the central member, ports in the outer surface of the central member communicating with the passages, certain of the central member passages carrying fluid under different pressures all of which are above atmospheric pressure, other of said passages serving to drain fluid, certain ports in the central member located in the same transverse plane leading to the passages carrying fluid under the different pressures and a drain passage, the housing having a plurality of axially spaced ports, certain of said ports being located in such transverse planes as to consecutively register with ports carrying fluid under different pressures and a drain port during relative rotation of the central and housing members, the housing having passages leading from said ports to fluid power operated apparatus.

JULIUS A. ZINN, Jr.
ODD WENNBERG.

REFERENCES CITED

The following references are of record in the file of this patent:

UNITED STATES PATENTS

| Number | Name | Date |
|---|---|---|
| 406,116 | Southwick | July 2, 1889 |
| 1,693,262 | Taylor | Nov. 27, 1928 |
| 1,851,502 | Ferris et al. | Mar. 29, 1932 |
| 1,872,626 | Ernst et al. | Aug. 16, 1932 |
| 1,972,464 | Soubier | Sept. 4, 1934 |
| 2,085,688 | Schuchman et al. | June 29, 1937 |
| 2,115,950 | Gurries et al. | May 3, 1938 |
| 2,148,494 | O'Neill | Feb. 28, 1939 |
| 2,165,096 | Frechette | July 4, 1939 |
| 2,383,349 | Slick | Aug. 21, 1945 |
| 2,398,542 | Light | Apr. 16, 1946 |